Sept. 22, 1970     G. RAPP ET AL     3,529,319

DEVICE FOR UNSCREWING MOULDED SCREW-PARTS FROM DIES

Filed April 7, 1967

INVENTORS
GÜNTER RAPP
HEINZ BLASKO

BY Dicke & Craig

ATTORNEYS

United States Patent Office 3,529,319
Patented Sept. 22, 1970

3,529,319
DEVICE FOR UNSCREWING MOULDED
SCREW-PARTS FROM DIES
Gunter Rapp and Heinz Blasko, Esslingen, Germany, assignors to Maschinenbau Rapp & Seidt, Esslingen, Germany
Filed Apr. 7, 1967, Ser. No. 629,278
Claims priority, application Germany, Apr. 20, 1966,
M 69,204
Int. Cl. B29d 1/00
U.S. Cl. 18—2            12 Claims

ABSTRACT OF THE DISCLOSURE

The disclosure is of an improved device for simultaneously unscrewing a plurality of moulded screw-parts from screw-threaded moulding dies or cores on a synthetic plastics moulding machine, the device comprising an endless travelling flexible unscrewing element such as a belt which is guided to engage and unscrew the moulded screw-parts arranged in a row.

INTRODUCTION AND BACKGROUND TO THE INVENTION

Figure 1:
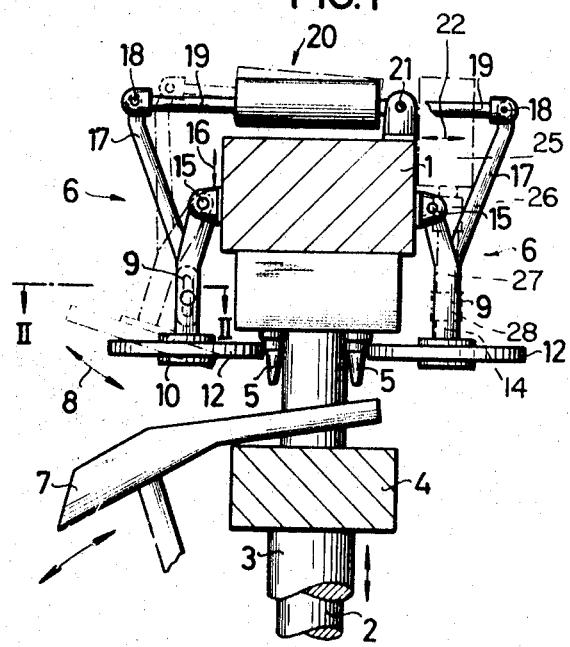

The present invention pertains to a device, provided upon machines for moulding screw-parts of synthetic resin for efficiently effecting the simultaneously unscrewing of a plurality of moulded parts from their respective dies, which device includes a driven unscrewing element in the form of an endless pressure-applying surface adapted for selective movement from an inoperative position to an operative position wherein the pressure-applying surface engages frictionally with the peripheral surface of the moulded parts, causing same to rotate relative to the respective dies to effect separation of the parts from the dies.

Such screw-parts, for example screw stoppers for tubes, bottles and the like, are mostly produced by a pressing process. They possess internal threading for example and must be unscrewed from the male die after shaping. In the case of relatively large screw-parts for example the male die is made rotatable and after the shaping is rotated until the screw-part is unscrewed. However in this case means must be provided to prevent the screw-part from accompanying this rotation. It is further known to remove the screw-part from the male die by means of an axially-engaging rotating tool. Both types of solution cause a fairly great technical expenditure.

It is also already known to employ a rubber disc to act simultaneously on the external periphery of one or two screw parts and to unscrew the screw parts by rotation of the disc. While thus it is possible to work automatically within certain limits, no more than two screw parts can however be unscrewed by one disc, so that for a plurality of screw parts a large number of discs is necessary. This necessarily entails extended conversion times and excessive costs commensurate therewith.

The problem upon which the invention is based consists in providing a device of the initially stated kind which, like the above-mentioned solution involving rubber discs, is provided with at least one rotating unscrewing element with endless pressure application surface which can be brought laterally from an inoperative position into an operative position engaged the external periphery of the screw parts, but which entails a considerably simpler assembly than that required for use of the rubber discs and affords a more reliable operation and a shorter conversion time.

BRIEF SUMMARY OF THE INVENTION

In solution of this problem, according to the invention the mentioned unscrewing element is formed as an endless belt guided over at least two reversing pulleys, thus providing at least one belt surface which is selectively frictionally engageable with a plurality of screw parts arranged in a straight row one behind the other.

FURTHER DESCRIPTION AND ADVANTAGES OF THE INVENTION

A plurality of screw parts can be unscrewed at the same time by this endless belt, thus substantially reducing the cycle time and the commensurate cost of manufacture. If it is necessary to adjust to a new moulding tool, it is merely necessary for the belt with the reversing pulleys to be readjusted as a unit, and it is then immediately adapted again to a whole row of screw parts. The conversion time is reduced in comparison with the disc construction style, depending upon the number of screw parts being produced, to about one twentieth. The belt is applied approximately tangentially, and thus in a wider region, to the screw part in each case than is a disc. Therefore the pressure application force can be smaller. A relatively light pressure suffices, so that frictional damage of the screw parts is effectively minimized, as compared with the use of discs. The belt arrangement according to the invention is largely maintainance-free in comparison with the disc construction style, runs more smoothly and yields more uniform wear.

The belt can be tensioned in a simple way. More advantageously with the belt run pressable against the screw parts there is associated, between the two reversing pulleys, a row of support rollers lying side by side.

It would be possible to press only the belt run situated between the two reversing pulleys against the row of screw parts and to move it away from them again by means of appropriate applicator rollers. However in further development of the invention the reversing pulleys with the belt are more advantageously arranged on a holder which is movable to the screw parts and away from them, so that they are moved back and forth as a whole. This holder is more advantageously pivotable inwards and outwards, namely by means of arms articulated on the synthetic plastics machine. As these arms are articulated for vertical movement on the synthetic plastics machine and/or adjustable in height in themselves, the belt can easily be adjusted to the row of screw parts in each case. The pivoting is effected more expediently by means of a cylinder/piston drive system, which engages through further arms provided on the holder. This drive connection is also more expediently adjustable so that the pivoting movement can be adjusted.

It is especially advantageous that the device according to the invention can be mounted on two sides of the synthetic plastics machine thus permitting the removal of a double row of screw parts simultaneously.

The endless belt preferably consists of an ordinary V-belt with a coating of soft rubber applied upon the free exterior surface thereof. The ordinary V-belt thus serves as a carrier. Due to the coating of soft rubber an extremely protective engagement on the newly-moulded part is obtained.

The technical assembly of the device according to the invention is very simple and robust. Furthermore it is very advantageous that reversing pulleys of large diameter can be used, thus making it possible to reach a row of moulding tools and screw parts which is recessed fairly far relative to the side wall of the machine part lying opposite thereto. In the case of the disc arrangement discussed above it can be seen that a flexibility of size of the discs would be severely limited, in contrast to the arrangement contemplated by the present invention. Thus, if moulding tools and screw parts were to be arranged closely adjacent one another, the discs employed could not exceed a relatively small diameter. This, however, would severely limit the applicability of the disc arrangement for use with moulding tools spaced apart by relatively substantial distances.

BRIEF DESCRIPTION OF THE VIEWS IN THE DRAWINGS

Figure 2:
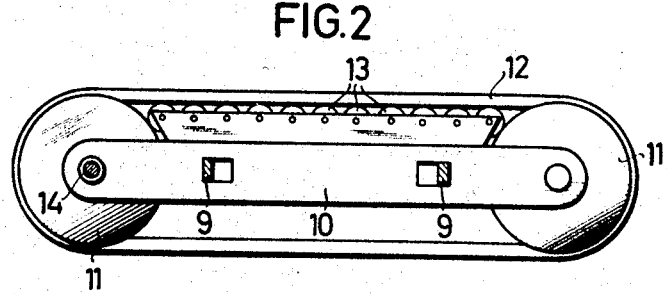
Figure 3:
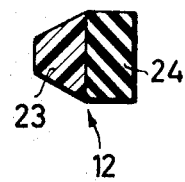

Further details and advantages of the invention will appear from the following description of an example of an embodiment of the present invention, which is illustrated diagrammatically in the accompanying drawing, wherein:

FIG. 1 shows an elevation view of the device according to the invention, in double formation, with the essential parts of the associated synthetic plastics machine, FIG. 2 shows a section along the line II—II in FIG. 1 and FIG. 3 shows a cross section through the belt.

DETAILED DESCRIPTION

The synthetic plastics machine as illustrated in section in the drawing consists essentially of an upper part 1 which is connected through columns 2 with a lower frame (not shown), and of a lower part 4 which is movable upwards and downwards by means of a piston 3. On the under side of the upper part 1 there is a double row of male dies lying side by side in plural arrangement, with which there are associated corresponding female dies (not shown) in the lower part 4. In the drawing only the moulded parts 5 still situated on the male dies are visible. In the example of our preferred embodiment these screw parts 5 are screw stoppers for tubes or bottles. After pressing they must be screwed from the male dies, by means of which their internal threading was formed. The device according to the invention used for screwing the parts 5 from the male dies is designated generally as unit 6. The lower machine part 4 can descend until an inwardly pivotable chute 7 can be disposed under the screw parts, on which chute these then slide downwards into a container or the like (not shown) after removal from the male dies.

The device according to the invention consists essentially of a holder 10 which is pivotable outwards and inwards in the direction of the arrow 8 by means of arms 9, in which holder there are mounted two reversing pulleys 11 for an endless belt 12 which defines two belt runs, of which the belt run acting on the external periphery of the screw parts 5 is supported, as shown by FIG. 2 at the rear thereof by a plurality of support rollers 13. One of the reversing pulleys 11 is driven by means of a shaft 14. The shaft 14 is here connected through universal couplings 26, 28 with a motor drive 25 secured on the upper machine part 1.

The arms 9 of the holder 10 are articulated to the upper machine part 1 at 15, and are, by virtue of the slotted coupling therein, vertically movable in the direction of the arrow 16. Moreover, in the manner which may be seen from FIG. 1, two further arms 17 are attached to them, which are articulated at 18 to the piston rod 19 of the cylinder/piston drive 20. The cylinder of this drive is articulated to the upper machine part 1 at 21 for movement in the direction of the arrow 22. By shifting of the articulation point or of the length of the piston rod 19 in the direction of the arrow 22 the magnitude of the pivoting movement about the point 15 can be varied. Thus the pressure application force can be adjusted. The pivoted-out position of the device 6 is indicated in dot-and-dash lines in FIG. 1.

The opposite second device 6 is assembled in exactly the same way and possesses its own cylinder/piston drive for pivoting.

According to the invention the endless belt 12 is assembled in accordance with the embodiment as illustrated in FIG. 3. As shown by FIG. 3 in cross section, it consists of an ordinary V-belt 23, serving as a carrier and of an externally attached coating 24 of soft rubber. The latter can preferably be about 10 x 10 mm. in cross sectional size. In the holder 10 there is also installed a tensioning device of any suitable type (not shown). The V-belt 23 here takes up the tension while the coating 24 of soft rubber effects a protective and large-area engagement with the moulded parts 5.

Of course, arms 17 can be constructed so as to be adjustable in length in order to vary the pivoting movement.

It would also be possible to form the endless belt according to the invention from a chain or a steel band or the like with external rubber-elastic coating.

While the present invention has been described with reference to but a single embodiment, it is to be understood that the scope of the invention is not limited to the details thereof, but is susceptible of numerous changes and modifications as would be apparent to one with normal skill in the pertinent technology.

What is claimed is:

1. In a machine for moulding of screw parts of synthetic resin or the like, having a plurality of male dies aligned in a row upon which articles are formed, the improvement comprising a device for the simultaneous removal of a plurality of moulded articles from the respective dies, including selectively movable means adapted for simultaneous frictional engagement with the peripheral surface of said plurality of moulded articles to cause rotation thereof relative to their respective dies, thus effecting an unscrewing of the articles from the dies, means for selectively moving said movable means between a first, inoperative position displaced laterally from engagement with said moulded articles, and a second, operative position in contact with said peripheral surface of said moulded article, and means for selectively driving said movable means in at least one direction to transmit, in its operative position, a force tending to cause an unscrewing of said moulded articles from their respective dies, wherein said selectively movable means includes an endless belt means supported for rotation upon at least two reversing pulley means, one run of said belt means being disposed so as to engage said peripheral surface of said aligned moulded articles when said movable means is in said operative position, pressure means for pressing said belt means against said peripheral surfaces, selectively movable support means upon which said reversing pulley means are supported, and further comprising arm means articulated at a portion of said machine at which said plurality of male dies are attached and connected with said support means for guiding the motion of said support means between said operative and inoperative positions.

2. The improvement according to claim 1, wherein said arm means are vertically-adjustably articulated at said machine.

3. The improvement according to claim 1, wherein said arm means are longitudinally extensible.

4. The improvement according to claim 1, further comprising cylinder/piston drive means articulated at said machine and further support arm means interconnecting said drive means and said support means to effect arcuate movement of said support means between said operative and said inoperative positions.

5. The improvement according to claim 1, wherein said arm means include first arm means secured each at one end to said support means and articulated each at the other end to said machine for pivoting said support means relative thereto, second arm means secured each at one end to one of said first arm means respectively and connected each at the other end with a drive means arranged at said machine.

6. The improvement according to claim 5, wherein said drive means is arranged at said machine adjustably in the direction of its driving action.

7. The improvement according to claim 5, wherein said drive means is connected with said second arm means adjustably in the direction of its driving action.

8. The improvement according to claim 1, wherein said device is provided on opposite sides of said machine, thus operative to simultaneously effect removal of a double row of moulded parts from their respective dies.

9. The improvement according to claim 1, wherein said belt means includes an endless loop constructed in the form of a carrier and a coating of relatively soft elastic material attached externally thereupon.

10. The improvement according to claim 9, wherein said carrier consists of an endless chain.

11. The improvement according to claim 9, wherein said carrier consists of an endless steel band.

12. The improvement according to claim 9, wherein said carrier consists of a V-belt.

References Cited

UNITED STATES PATENTS

| | | |
|---|---|---|
| 2,155,316 | 4/1939 | Lauterbach. |
| 2,225,672 | 12/1940 | Webb. |
| 2,285,297 | 2/1942 | McGinnis. |
| 2,408,629 | 10/1946 | Green. |

FOREIGN PATENTS

| | | |
|---|---|---|
| 839,577 | 6/1960 | Great Britain. |

J. HOWARD FLINT, Jr., Primary Examiner